April 25, 1967 W. C. DASH ETAL 3,316,130

EPITAXIAL GROWTH OF SEMICONDUCTOR DEVICES

Filed May 7, 1963 2 Sheets-Sheet 1

Inventors:
William C. Dash, deceased.
by Evelyn M. Dash, Executrix.
Ernest A. Taft, Jr.

by John F. Ahern
Their Attorney.

Inventors:
William C. Dash, deceased.
by Evelyn M. Dash, Executrix.
Ernest A. Taft, Jr.
by John F. Ahern
Their Attorney.

United States Patent Office 3,316,130
Patented Apr. 25, 1967

3,316,130
EPITAXIAL GROWTH OF SEMICONDUCTOR DEVICES

William C. Dash, deceased, late of Schenectady County, N.Y., by Evelyn M. Dash, executrix, Schenectady County, N.Y., and Ernest A. Taft, Jr., Schenectady County, N.Y., assignors to General Electric Company, a corporation of New York Filed May 7, 1963, Ser. No. 278,787
10 Claims. (Cl. 148—175)

The present invention relates to a method of and apparatus for epitaxially depositing layers of semiconductive material on a single crystal semiconductive substrate and to devices produced thereby. As used herein epitaxial growth refers to growth of layers of semiconductive material upon a substrate crystal in which the growing layer is an extension of the substrate crystal, maintaining the same crystal structure, order, etc., but may vary as to imputity inclusions so as to exhibit different electrical properties, as for example, conductivity type.

Factors relating to cost, quality, and speed of manufacture of semiconductor devices are of extreme importance due to the numerous uses of these devices. It has previously been discovered that a significant improvement can be made in the quality of semiconductive devices if the various layers of different impurity doping levels are grown epitaxially on a single crystal. That is, the successive layers should be deposited so as to form a continuation of the substrate crystal.

Various methods of accomplishing this type of growth have been proposed, but serious difficulties have been encountered in each. For example, in the production of silicon or germanium semiconductor devices, systems have been developed in which hydrogen is used to reduce silicon tetrachloride ($SiCl_4$) or germanium tetrachloride ($GeCl_4$), so that the resultant silicon or germanium deposits epitaxially on a crystal. Selective impurity addition or "doping" is achieved by introducing "doping gases" such as phosphorus trichloride or boron trichloride containing an electrically significant element for addition to the semiconductor lattice. However, turbulence in the flow of the reacting gases is a source of a great deal of nonuniformity in the thickness and the resistivity of the layer so formed. In addition, the purity of the source materials must be carefully monitored as successive devices are prepared, and elaborate schemes must be developed to obtain a reproducible concentration of the doping gases. Other processes, such as the disproportionation of $GeI_2$ or $SiI_2$ in a closed tube process, simplify the gas handling problems, but the transport rates are only 0.05 micron per minute to 0.2 micron per minute for germanium under conditions which give reasonable uniformity of thickness. Similar growth rates apply in the case of silicon and other electronic semiconductors. At rates which are comparable to those obtained in the hydrogen reduction process, effects of gas turbulence on uniformity are appreciable.

A high vacuum epitaxial growth of silicon has been proposed. Such growth is not troubled by gas flow or by doping problems, since the doping impurity comes directly from the source of silicon which also acts as a heater. However, this process is handicapped by the necessity for a vacuum of $10^{-8}$ millimeters of mercury pressure or less to obtain good layers.

A further problem encountered in previous depositions of semiconductive layers by epitaxial growth, which may arise either from the turbulence and convection currents generated by the relatively high gas pressures and high temperatures or from the fact that previous transportation has been from a hot source to a slightly cooler substrate, is the problem of diffusion of the higher concentration of impurity into the material containing the lower impurity concentration. In the case of gas deposition, depositing a high concentration material on a low concentration material and deposition of a low concentration material on a high concentration both result in such diffusion. In the case of other epitaxial methods, deposition of a low concentration material on a high concentration material results in the same solid state diffusion of the impurity across the boundary, resulting in a "smearing" of the boundary, which should be sharply defined. Obviously, the sharpness of the operating characteristics of a semiconductor device grown by such methods will be adversely affected by the lack of a sharply defined boundary.

A process has also been proposed utilizing iodine vapor at a high pressure as the transport element between a widely separated source and substrate. The source and substrate are maintained at temperatures of a few hundred degrees centigrade and the process results in a deposit of silicon on a silicon substrate to a depth of .002 inch (approximately 50 microns) after a running time of 3 days. Obviously, such an extended growth time cannot be permitted if semiconductor devices are to be mass produced rapidly.

The present invention is directed to the growth of semiconductor devices so as to avoid the above-mentioned problems of solid state diffusion and "smearing" and nonuniformity of thickness and resistivity while, at the same time, providing a very fast growth rate in a system which is maintained at easily reproducible growth conduitions.

It is therefore an object of the present invention to provide an improved method and apparatus for epitaxially growing single crystal semiconductor devices.

It is a further object of the present invention to provide imroved semiconductor devices including uniformly deposited epitaxial layers on a single crystal semiconductor substrate.

A still further object of the present invention is the provision of an improved method and apparatus for rapidly growing epitaxial layers of the semiconductive material on a single crystal semiconductive substrate.

Another object of the present invention is the provision of an improved method and apparatus for epitaxially growing layered semiconductive devices wherein turbulence of the gas present during growth is avoided and improved uniformity of thickness and resistivity is achieved.

A further object of the present invention is the provision of an improved method and apparatus for epitaxially growing layered single crystal semiconductor devices under conditions which are easily obtained and easily reproducible.

Briefly, in accordance with one embodiment of the present invention, a sealed, evacuatable envelope is provided wherein a single crystal substrate of an appropriate semiconductive material and a source of semiconductive material are positioned in closely spaced relationship. Either the source or the substrate or both may have an appropriate doping impurity added. Means are provided to heat the source to appropriate temperatures, for example, more than 1000° C. in the case of silicon, and also to heat the substrate to a temperature slightly higher than that of the source. Further means provide a low pressure iodine vapor atmosphere so that the semiconductor material plus any doping impurity are rapidly transported from the source to the substrate crystal. The surface of the substrate crystal is substantially coplanar with one of the crystal surfaces as defined by the Miller indexes and the deposition occurs epitaxially. In accord with another feature of the present invention the impedance of the gas flow through the space between the source and the substrate is provided by the use of a partially open barrier or baffle therebetween which reduces turbulence.

The present invention has broad applicability to practice with semiconductive materials used in fabricating electronic semiconductive devices. For ease of description, however, the process will be described as applied with germanium and silicon, although it will be appreciated that other materials, as for example, gallium arsenide and indium arsenide may be used in the practice of the invention.

The novel features believed characteristic of the invention are set forth in the appended claims. The invention itself, together with further objects and advantages thereof may best be understood by reference to the following description taken in connection with the appended drawings in which:

Figure 1:
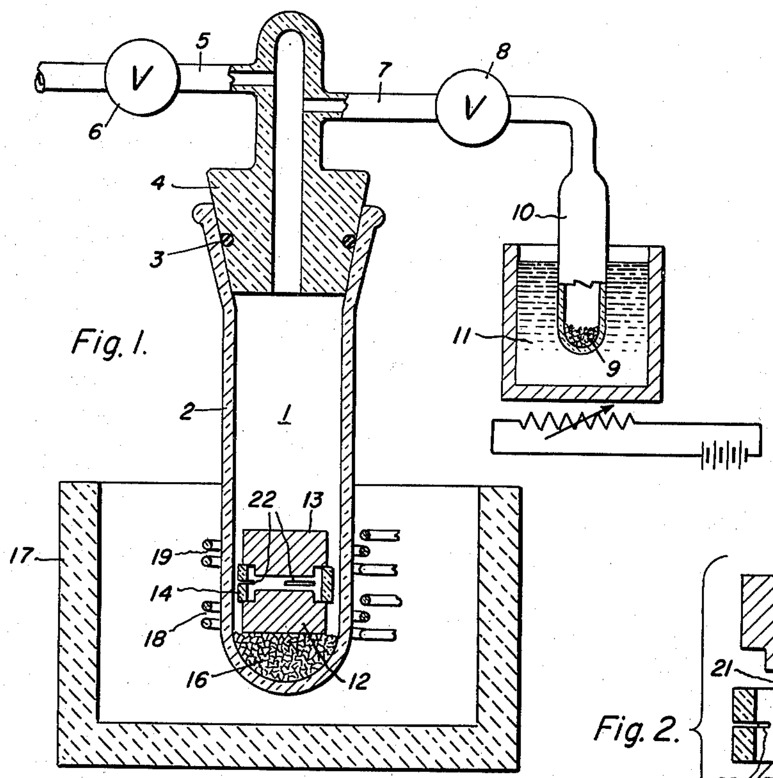
FIGURE 1 is a vertical sectional view of the apparatus of the present invention.

In FIGURE 1, one apparatus useful in the practice of the present invention is illustrated. Area 1, wherein the deposition of semiconductive material takes place, is enclosed by a sealed envelope comprising a reaction vessel 2, composed of an appropriate heat-resistant material such as quartz, O-ring 3 and hollow stopper 4. Stopper 4 is open to area 1 and is also connected through tubing 5 and valve 6 to a vacuum pump and through tubing 7 and valve 8 to a source of iodine vapor. The iodine vapor source comprises iodine crystals 9 located in tube 10, the heat necessary to generate iodine vapor being supplied by water bath 11. In addition, the upper portion to tube 2, stopper 4, and tubing 5 and 7 may be appropriately heated by known means such as heating tape, not shown, to prevent condensation of the iodine vapor.

Figure 2:
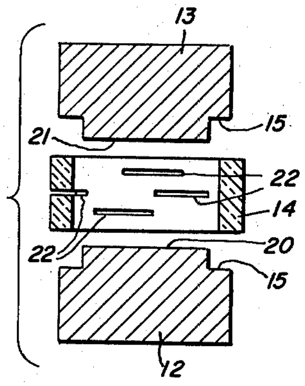
FIGURE 2 is an exploded view of a detail of FIGURE 1.

Enclosed within area 1 are substrate 12, source 13, and separating ring 14, more clearly illustrated in FIGURE 2. The substrate 12 and source 13 may comprise similar wafers or blocks, for example, about two centimeters in diameter and about seven millimeters thick, held at a specified close proximity, for example ranging from 0.1 to 2 millimeters, by separating ring 14. Shoulders 15 cut into the facing surfaces of the wafers provide an easily assembled, stable assembly. Substrate 12 is placed on a base 16 of cracked quartz to prevent contact with the tube wall when the substrate is heated. The wafers are heated to a high temperature, in the neighborhood of several hundred degrees centigrade by an appropriate heating means or furnace indicated schematically at 17 in order that the semiconductor crystals become conductive enough so that they may be coupled for radio-frequency heating. Radio frequency induction coils 18 and 19 are provided around the lower portion of tube 2 to raise the temperature of the source and substrate to the operating temperature and to maintain the temperature differential therebetween.

Substrate 12 comprises a wafer of semiconductive material in the form of a single crystal so oriented that one of its crystalographic planes, for example, that defined by the Miller indexes (110) or that defined by Miller indexes (111), is substantially coplanar with surface 20 which faces source 13. Substrate 12 may comprise a single crystal of doped or undoped semiconductive material or, alternatively, may be a single crystal having a plurality of layers of various impurity concentration which have previously been epitaxially deposited on a base member.

Source 13 comprises a block of semiconductive material to be deposited on surface 20 of substrate 12 and has the impurity concentration which is to exist in the layer to be deposited. Source 13 has no preferred form or orientation except that surface 21 be juxtaposed in closely spaced relationship to surface 20. Ring 14 provides a support for source 13. Ring 14 is preferably made of an appropriate heat-insulating material such as quartz.

Slots 22 in spacer 14 are provided to allow entrance of a limited amount of iodine vapor into the space or cavity between substrate 12 and source 13. In prior devices, the source and substrate have been widely separated, as for example several centimeters, and the high gas pressure and high temperatures which exist within the transport region have resulted in a great deal of turbulence caused by convection currents in the gaseous atmosphere. Slots 22, or other appropriate limiting openings in ring 14, allow entrance of a sufficient amount of vapor to carry out the transportation while ring 14 and the close spacing of the source and substrate limit the turbulent movement of the iodine vapor within the cavity. A partially closed system is defined by the abovedescribed structure so that the deposition can proceed without being affected by turbulence. In limitation on the amount of iodine vapor permitted in the transportation area also limits the quantity of undesired impurities which might be introduced into the deposited layer from the iodine.

To perform deposition in accord with the invention, the system is evacuated through tubing 5, and substrate 12 and source 13 are raised to a temperature of several hundred degrees by furnace means 17, the exact value being dependent on the material. The wafers are then coupled with, and heated by, the induction coils 18 and 19 to such temperatures that transportation from the source to the substrate will occur when iodine vapor is admitted. This temperature varies with the materials being used. In the case of silicon, for example, the source temperature may be approximately 1000° to somewhat less, say 100° C. less, than the substrate temperature and the substrate temperature may be as high as approximately 1400° C. For germanium the source should be at a temperature above 600° C. and less, as for example, 50° C. or 100° C. less, than the substrate temperature, which may be as high as 930° C.

The range of temperatures within which the invention may be practiced is set by the temperature of the substrate. In general the substrate should be at a minimum temperature denominated as "the practical iodide decomposition temperature" and at a maximum temperature that is below a point denominated "the solid state stability temperature." As used herein "the practical iodide decomposition temperature" is that temperature at which the iodide or iodides of the semiconductor, or of its constituents if a compound is used, begins to decompose and deposit the semiconductor upon the substrate at a reasonable and practical rate, namely at least one micron per minute. Also as used herein the phrase "solid state stability temperature" means the maximum temperature at which the substrate material remains stably in the solid state. For elemental semiconductors such as germainum or silicon, this is approximately the melting point temperature. For compound semiconductors such as gallium arsenide this is the temperature at which dissociation or decomposition of the compound begins in the atmosphere utilized. Obviously, this temperature may be raised somewhat by adding a back-pressure of the more volatile constituent, as for example, arsenic in the case of gallium arsenide. In all cases, the coils 18 and 19 are so adjusted that the substrate is heated to a higher temperature than that of the source. Iodine vapor is next admitted, the pressure being held at an appropriate value between 0.5 and 5 mm. of Hg. The iodine pressure is of great importance in the performance of the present invention, since it has been found that both very low pressures of iodine, for example 0.1 mm. of Hg, and very high pressures of iodine, for example 80 mm. of Hg, result in reverse transportation, that is, deposition of substrate material on the source. Also, even moderately high iodine vapor pressures may result in removal from the source at a rate too high for the deposition to be of good quality. The deposited material may arrive in such quantities that it cannot fall orderly into the crystal structure. Accordingly, the iodine vapor pressure in the system of the present invention is preferably kept within the range indicated above. After an appropriate length of time to allow deposition of a layer of the desired thickness, the system is allowed to cool and the substrate is removed. Alternatively, a new source may be positioned and a new layer, having a different impurity concentration, may be deposited in a subsequent operation by repeating the above-described process.

The resultant layer deposited upon the substrate 12 is an epitaxial layer forming a continuation of the original substrate crystal. The impurity concentration of the source 13 is transferred directly to the substrate layer with the semiconductive source material.

A number of distinctions and resultant advantages are inherent in the method and apparatus of the present invention. First, the present invention relates to performing the crystal growth at high temperatures, for example above 1000° C. in the case of silicon and above 600° C. in the case of germanium. Secondly, the iodine vapor pressure is carefully regulated by the external water bath to a low value. The importance of this is noted since the pressure can be controlled independently of the temperature in area 1 by control over the water bath. Thirdly, the source and substrate are very closely spaced. These three critical factors contribute to an extremely high growth rate of, for example, 2–10 microns per minute. Each factor affects the growth rate to a significant extent and, in combination, the growth rate becomes a great deal higher than those previously achieved. For example, deposition of a silicon layer having a thickness of 50 microns (approximately .002 inch) could be achieved in about 25 minutes if the minimum rate mentioned above is used or in about 5 minutes if the maximum rate is used. It is noted that, as previously mentioned, the prior art requires approximately 3 days to complete a deposition of this thickness.

Further advantages are also inherent in the present invention, for example, the fact that a relatively small amount of iodine vapor is required which decreases the cost of the process. Also, the limitation of flow through the space between the substrate 12 and source 13 eliminates most of the convection currents and turbulence in the iodine vapor within the space. This results in greatly improved uniformity of thickness and uniformity of impurity concentration of the doped layer. Also, the reduction of the rate of passage of iodine vapor through the cavity limits the amount of iodine vapor which participates in the transportation, thereby decreasing the possible amount of impurities which may be introduced into the deposited layer from the iodine vapor.

The apparatus of the present invention, including source 13 and substrate 12 are easily obtained by presently known methods, also contributing to the inexpensiveness of the apparatus.

Figure 3:
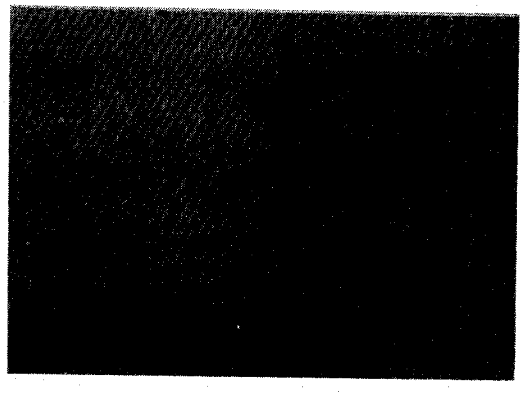
FIGURE 3 is a photographic illustration of a surface resulting from a deposition performed in accordance with the present invention.

A photomicrograph, taken at a magnification of 600, of the surface of a typical deposit made in accordance with the present invention is shown in FIGURE 3. This surface has been treated with a bright chemical etch ($1HF+3HNO_3+10HC_2H_3O_2$) and rinsed with distilled water to prepare for observation and photographing. The surface is that of a silicon layer approximately 20 microns thick and, as can be seen, is essentially featureless, having only a few stacking faults and etch pits. Proper care used during the deposition results in repeated surfaces of the quality shown in FIGURE 3 or better.

Although the above description of the apparatus and method of the present invention is sufficient to enable one skilled in the art to practice the invention, the following discussion of the theory of operation as presently understood is included as a clarification of the present invention.

However, it is not intended to limit the scope of the invention to the following theory and the claims are directed to the apparatus and method described.

Assume source and substrate ingots 12 and 13 are of silicon. Iodine vapor enters the cavity between substrate 12 and source 13 through slots 22 in ring 14. The iodine vapor contacting the lower temperature surface 21 of the source combines with the surface molecules, breaking them free of the source 13 and forming an iodide of silicon. The resultant iodide diffuses quickly to the surface 20 of the substrate, whereupon the higher temperature of the substrate decomposes the iodide and releases the iodine so that it can return to the source to take part in further transportation. Since the surface of the source is uniformly removed, the impurity concentration of the source will be repeated with high precision in the deposited layer and the reduction of convection currents or turbulence in the enclosed cavity enables the deposition to take place with a high degree of uniformity of both thickness and resistivity across the surface of the substrate. The epitaxial growth occurs, continuing the single crystal nature of the substrate, due to the tendency of the transported material to fall naturally into the appropriate crystal locations.

Upon completion of a layer of appropriate thickness, the induction coil is removed, the iodine vapor is cleared from the system and the source is replaced by a different wafer having a different impurity concentration so that a new deposition can be performed. For example, if the initial substrate were a layer of N-type material, the successive layers deposited thereon could be P-type and N-type, thereby building wafer from which may be cut blanks of an N-P-N transistor. Upon completion of deposition of as many layers as may be desired, the epitaxial single crystal semiconductor device may be removed and operated upon, for example by cutting, after cutting into the desired size and shape blanks, electrodes and encapsulation follow to form a desired semiconductor device.

In a commercially operaing apparatus, the substrate and source ingots would be so arranged as to obviate the necessity of "breaking-down" the system to change from one source to another. Thus, for example, a plurality of different conductivity type and value source ingots could be mounted upon a rotatable or pivoted wheel, operated through a vacuum-tight seal by a screw and worm. Thus when one layer of one-conductivity type semiconductor has been deposited by the method of the invention, the wheel is rotated, bringing a different conductivity type source into juxtaposition with the substrate ingot and a second layer of different-conductivity type material is deposited.

Figure 4:
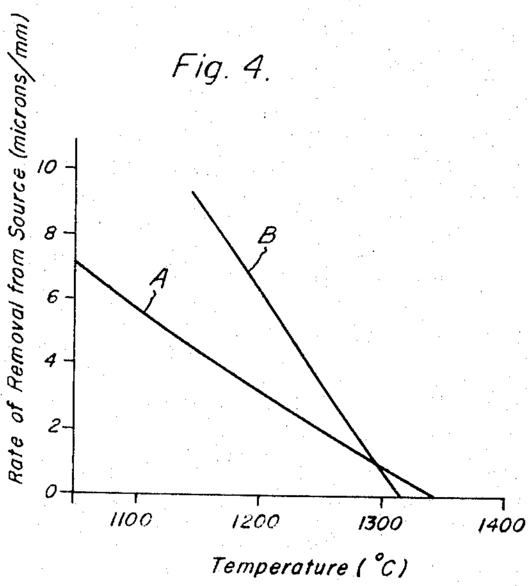
FIGURES 4–6 are graphs illustrating the results of variation of the parameters.
Figure 5:
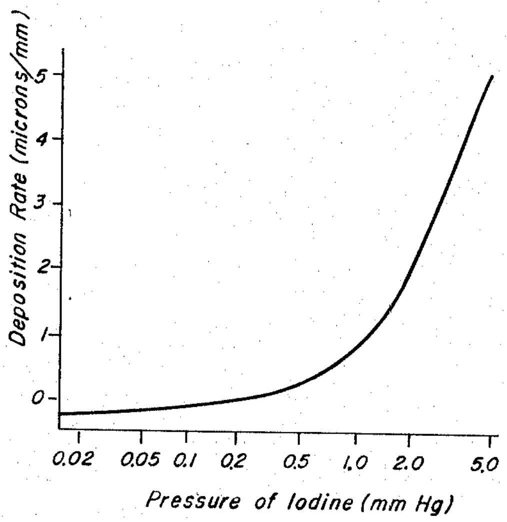
Figure 6:
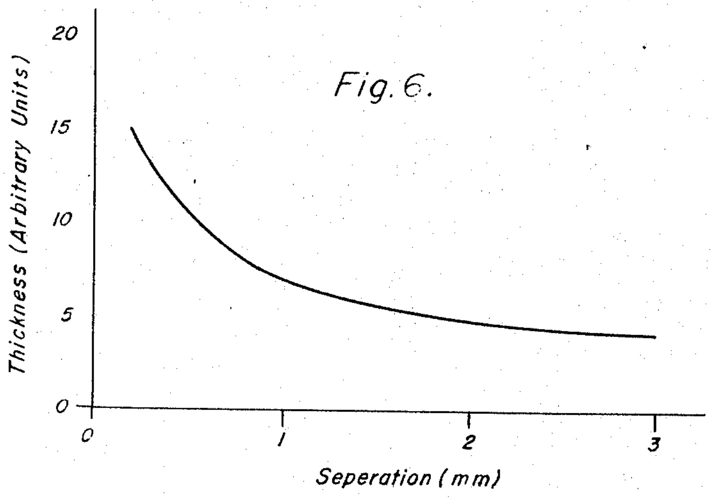

To illustrate the characteristics of the deposition and the importance of the various parameters, a number of curves, derived from actual data using silicon as both source and substrate, are illustrated in FIGURES 4 through 6. FIGURE 4 is a graph of the rate of removal of source material as a function of the source temperature. This graph is taken at a substrate temperature of 1370° C. and with a separation distance of 1 mm. Both the source and the substrate are silicon. Two sets of data are illustrated. The set making up curve A, was measured at an iodine vapor pressure of 1 mm. of Hg while curve B data, was taken at an iodine vapor pressure of 3 mm. of Hg. It can be seen from this graph that the removal rate from the source decreases rapidly as the source temperature approaches the substrate temperature. It has been found that high growth rates and high quality surfaces are best obtained with source-substrate temperature differences in the range of those plotted, that is, not more than about 200° C. in the case of silicon. Higher temperature differences transfer more material than can be orderly deposited on the crystals.

FIGURE 5 is a plot of rates of deposition of silicon as a function of the iodine vapor pressure within the transport area. These data were taken at a substrate temperature of 1370° C. and a source temperature of 1250° C. with a separation between the substrate and the source of 1 mm. It can be seen in this plot that, when the iodine pressure decreases below approximately .2 mm. of Hg, the deposition rate becomes negative, that is, silicon is removed from the surface of the substrate. Accordingly, the iodine pressure must be at least greater than 0.2 mm. of Hg. The preferred iodine vapor pressure for purposes of the present invention is the value above about 0.5 mm. of Hg. As previously noted, the best combination of growth rate and uniform deposition can be achieved at vapor pressures of from 0.5 to 5 mm. of Hg. Although higher rates of deposition can be achieved at higher iodine pressures, it has been found that the rate of material deposition becomes higher than the rate at which the material can be deposited in an orderly fashion on the crystal surface. Thus, the crystal surface develops faults and aberrations which are undesirable.

FIGURE 6 is a graph of the deposition rate versus the separation distance between the source and substrate. Substantially identical shapes are obtained for this curve regardless of variation of the iodine vapor pressure, assuming the source to be held at 1290° C. and the substrate at 1370° C. so that the units of the deposition rate are arbitrary, being variable with the iodine vapor pressure. It will be noted from this graph that the optimum separation is less than 1 mm. As previously indicated, critical values for useful results lie between 0.1 and 2 mm.

Figure 7:
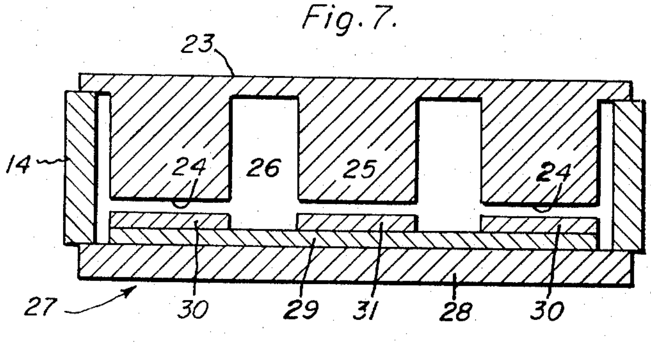
FIGURE 7 is a vertical sectional view of another embodiment of the present invention.

FIGURE 7 is illustrative of one of the many variations which can be made of the present invention, depending on the particular results desired. Source 23, rather than having an uninterrupted planar surface as in the case of source 13, has an annular surface portion 24 and a circular center surface portion 25. In other words, an annular groove 26 is cut into the face adjacent the substrate. Separating ring 14 is used to support the source 23 and maintain a given separation between the source and the substrate 27. The substrate comprises a base 28 of intrinsic semiconductive material upon which a layer 29 has previously been epitaxially deposited. Use of the method and apparatus of the present invention with source 23 and substrate 27 results in the deposition of an annular ring 30 and a circular "mesa" 31 upon layer 29. This device could then be used, for example, as a transistor having a base comprising layer 29, an emitter comprising annular region 30, and a collector comprising region 31. Depending on the conductivity types of the materials used, the device could be an N-P-N or P-N-P transistor, grown in the form of a single crystal.

While the invention has been practiced as described herein, as evidenced by the photomicrographs and graphs, the care which must be used is great. The success realized in practicing the growth method of the invention often depends upon the cleanliness of the substrate surface before deposition. Therefore, in instances in which it is apparent that a problem of surface cleanliness exists, precleaning of the substrate prior to epitaxial deposition in accord with the invention may be included. Such cleaning may, for example, be accomplished by admitting hydrogen to the reaction chamber at one atmosphere or slightly higher pressure and heating the semiconductor ingots to operating temperature for 5 to 10 minutes. Alternatively, the substrate may be cleaned by admitting thereto an ionizable inert gas such as argon at a pressure of, for example, 10 to 100 microns and energizing the induction coils to establish a glow discharge between the ingots. Alternatively, the substrate surface may be cleaned, prior to admission of iodine, by thermal evaporation in a vacuum of approximately one micron pressure or less for a few seconds at operating temperature or for a longer time at lower temperatures.

Although specific data can be obtained from the points plotted in FIGURES 4–6, the following specific examples are given as illustrations of the operation of the present invention.

*Example 1*

The apparatus of FIGURE 1 is used. A semiconductive device is made utilizing a silicon source and a monocrystalline silicon substrate, maintained respectively at temperatures of 1200° C. and 1370° C. with an iodine vapor pressure of 3 mm. of Hg and a separation of 1 mm. The deposition rate under these conditions is 6.5 microns per minute.

*Example 2*

The apparatus of FIGURE 1 is used. A semiconductive device is made utilizing a silicon source and a monocrystalline silicon substrate, maintained respectively at temperatures of 1200° C. and 1370° C. wth an iodine vapor pressure of 1 mm. of Hg and a separation of 1 mm. The deposition rate under these conditions is 3.0 microns per minute.

*Example 3*

The apparatus of FIGURE 1 is used. A semiconductive device is made utilizing a silicon source and a silicon substrate, maintained respectively at temperatures of 1250° C. and 1370° C. with an iodine vapor pressure of 3 mm. of Hg and a separation of 1 mm. The deposition rate under these conditions is 3.5 microns per minute.

*Example 4*

The apparatus of FIGURE 1 is utilized. A semiconductive device is made utilizing a silicon source and a monocrystalline silicon substrate, maintained respectively at temperatures of 1290° C. and 1370° C. wth an iodine vapor pressure of 3 mm. of Hg and separation of 1 mm. The deposition rate under these conditions is 1.9 microns per minute.

*Example 5*

The apparatus of FIGURE 1 is used. A semiconductive device is made utilizing a silicon source and a monocrystalline silicon substrate, maintained respectively at temperatures of 1290° C. and 1370° C. with an iodine vapor pressure of 3 mm. of Hg and separation of 0.5 mm. The deposition rate under these conditions is 2.9 microns per minute.

*Example 6*

The apparatus of FIGURE 1 is used. A semiconductive device is made utilizing a germanium source and a monocrystalline germanium substrate, maintained respectively at temperatures of 870° C. and 920° C. with an iodine vapor pressure of 3 mm. of Hg and separation 0.74 mm. The deposition rate under these conditions is 10 microns per minute.

*Example 7*

The apparatus of FIGURE 1 is used. A semiconductive device is made utilizing a germanium source and a monocrystalline germanium substrate, maintained respectively at 820° C. and 870° C. with an iodine vapor pressure of 3 mm. of Hg and a separation of 0.75 mm. The deposition rate under these conditions is 8 microns per minute.

The specific embodiments described herein are presented merely as examples of the practice of this invention may take and are not to be construed in a limiting sense. Likewise the invention has been described for sake of clarity with certain materials, although it is generally applicable. Therefore, it is intended in the appended claims to cover all modifications and variations which come within the true spirit and scope of this invention.

What I claim as new and desire by Letters Patent of the United States is:

1. A method of growing a semiconductor device in the form of a single crystal comprising the steps of:

(a) placing a single crystal substrate of an electronic semiconductive material selected from the group consisting of germanium and silicon within an evacuatable enclosure, said substrate having one surface substantially coplanar with one plane of said crystal;

(b) disposing a source body of the same semiconductive material a sufficient distance from said one surface of said substrate to limit turbulence between said body and said substrate;

(c) heating said source and said substrate, said substrate being heated to a higher temperature than said source; and (d) introducing an atmosphere of iodine vapor between said source and said substrate to a pressure in the range of 0.5 to 5 mm. of Hg while continuing said heating to cause semiconductive material of said source to be epitaxially deposited on said substrate by an iodine transport process.

2. A method of growing an electronic semiconductor device in the form of a single crystal comprising the steps recited in claim 1 including the further step of:

(a) positioning said source at a distance between 0.5 and 2 millimeters from said one surface of said substrate.

3. A method of growing a silicon device in the form of a single crystal comprising the steps recited in claim 1 including the further step of:

(a) heating said source and said substrate to temperatures above 1000° C.

4. A method of growing a semiconductor device in the form of a single crystal comprising the steps of:

(a) providing an evacuatable enclosure;

(b) disposing a single crystal substrate of an electronic semiconductive material selected from the group consisting of germanium and silicon in said enclosure, said substrate having one surface substantially coplanar with one plane of said crystal;

(c) disposing a source of the same semiconductive material in said envelope and a sufficient distance from said one surface of said substrate to permit epitaxial deposition of material from said source on said substrate and to limit turbulence between said source and said tubstrate;

(d) heating said source and said substrate, said substrate being heated to a higher temperature than said source;

(e) introducing an atmosphere of iodine vapor into said enclosure around said source and said substrate to a pressure in the range of 0.2 to 5 mm. of Hg while continuing said heating;

(f) baffling the volume between said source and said substrate so as to limit the flow of iodine vapor between said source and said substrate to cause semiconductive material of said source to be epitaxially deposited on said substrate by an iodine vapor transport process.

5. A method of growing a semiconductor device in the form of a single crystal comprising the steps of:

(a) placing within an evacuatable enclosure a single crystal substrate of an electronic semiconductive material selected from the group consisting of germanium and silicon, said substrate having one surface substantially coplanar with one surface of said crystal;

(b) disposing a source body of the same semiconductive material a sufficient distance from said one surface of said substrate to permit epitaxial deposition of material from said source on said substrate and to limit turbulence between said source and said substrate;

(c) heating said source and said substrate to raise the temperature of both, said substrate being heated to a higher temperature than said source;

(d) connecting with said enclosure a source of iodine vapors within the range of 0.5 to 5 mm. of Hg;

(e) controlling the pressure of said iodine vapors by means independent of the heating of said substrate and said source to cause semiconductive material from said source to be transferred to said tubstrate and deposited epitaxially thereon by an iodine vapor transport process.

6. A method of growing an electronic semiconductor device in the form of a single crystal comprising the steps recited in claim 6 including the further step of:

(a) positioning said source at a distance between 0.5 and 2 millimeters from said one surface of said substrate.

7. A method of growing a silicon device in the form of a single crystal comprising the steps recited in claim 5 including the further step of:

(a) heating said source and said substrate to temperature above 1000° C.

8. The method of growing epitaxial layers of silicon comprising: cleaving and polishing a crystal of silicon to provide a smooth substantially planar surface thereupon which is substantially coplanar with one crystallographic plane thereof; disposing said silicon substrate crystal within an evacuatable reaction chamber; disposing a source body of silicon within said evacuatable reaction chamber in close juxtaposition with said silicon substrate crystal, one planar surface of said source body being spaced-apart from said surface of said silicon substrate crystal a distance sufficient to permit epitaxial deposition of material from said source on said substrate and substantially parallel therewith but separated therefrom by a distance of less than about two millimeters to limit turbulence between said source and said substrate; heating said substrate and said source to body to a temperature of approximately 1000° C. to1400° C., said source body being heated to a temperature of at least 100° lower than said substrate crystal; introducing an atmosphere of iodine vapor into said envelope at a pressure between about 0.5 and 5 millimeters of mercury while continuing said heating to cause the material of said source to be epitaxially deposited upon said substrate by an iodide transport process; and baffling the volume between said source and said substrate so as to limit the flow of iodine vapor into the space within said source and said substrate to prevent turbulence therebetween.

9. The method for growing epitaxial layers of germanium which method comprises: cleaving and polishing a crystal of germanium to provide a germanium substrate body having a smooth substantially planar surface which is substantially coplanar with one crystallographic plane thereof; disposing said germanium substrate crystal within and evacuatable reaction chamber; disposing a source body of germanium within said evacuatable reaction chamber with one surface of said body substantially parallel with the one surface of said silicon substrate crystal and spaced-apart therefrom by a distance sufficient to permit epitaxial deposition of material from said source on said substrate, said distance being no greater than about 2 millimeters to limit turbulence between said source and said substrate; heating said substrate and said source to temperatures of approximately 600° C. to 900° C., said source being heated to a lower temperature than said substrate; introducing an atmosphere of iodine vapor into said reaction chamber at a pressure between 0.5 and 5 millimeters of mercury while continuing said heating to cause the material of said source to be epitaxially deposited upon said substrate by an iodide transport process; and baffling the volume between said source and said substrate so as to limit the flow of iodine vapor into the space between said source and said substrate to prevent turbulence therebetween.

10. A method of growing a semiconductor device in the form of a single crystal comprising the steps recited in claim 4 and including the further step of:

(a) positioning said source at a distance between 0.1 and 3 millimeters from said one surface to said substrate.

(References on following page)

References Cited by the Examiner

UNITED STATES PATENTS

| | | | |
|---|---|---|---|
| 2,780,569 | 9/1957 | Hewlett | 148—174 |
| 2,840,494 | 6/1958 | Parker | 148—1.5 |
| 2,850,414 | 9/1958 | Enomoto | 148—1.6 |
| 3,012,902 | 12/1961 | Bayer | 117—106 |
| 3,047,438 | 7/1962 | Marinace | 148—175 |
| 3,072,507 | 1/1963 | Anderson et al. | 148—175 |
| 3,099,579 | 7/1963 | Spitzer et al. | 148—175 |
| 3,140,965 | 7/1965 | Reuschel | 148—175 |
| 3,142,596 | 7/1965 | Theuerer | 148—175 |
| 3,148,094 | 9/1965 | Kendall | 148—175 |

DAVID L. RECK, *Primary Examiner.*

N. F. MARKVA, *Assistant Examiner.*